Patented Oct. 7, 1941

2,258,412

UNITED STATES PATENT OFFICE 2,258,412

PROCESS OF PRODUCING ALUMINUM FLUORIDE

Leopold Kahl, Berlin, Germany, assignor to the firm Ruetgerswerke-Aktiengesellschaft, Berlin, Germany No Drawing. Application February 4, 1939, Serial No. 254,601. In Germany March 9, 1938

6 Claims. (Cl. 23—88)

This invention relates to a process for the preparation of aluminum fluoride.

It is known that aluminium sulphate reacts with fluor spar according to the following equation:

$$Al_2(SO_4)_3 + 2CaF_2 = Al_2F_4SO_4 + 2CaSO_4$$

If, for example, finely pulverized fluor spar is treated with a saturated aqueous solution of aluminium sulphate, the fluor spar is converted into calcium sulphate, and at the same time a solution of the double salt $Al_2F_4SO_4$ is obtained. The reaction can be facilitated by heating. After the reaction has been finished, the solution of said double salt can be separated from the precipitated calcium sulphate by filtration.

The fluor-aluminum double salt may be obtained from the solution prepared in the above described or another suitable manner, by evaporating or vaporizing the solution which becomes first sirupy and then pasty during evaporation.

I have found that aluminium fluoride can be obtained in a simple manner from the double salt of the formula $Al_2F_4SO_4$ by heating said salt to temperatures over 100° C., preferably to 200–300° C. Such heating causes decomposition of the double salt, whereby aluminium fluoride and aluminium sulphate are formed according to the following equation:

$$3Al_2F_4SO_4 = 4AlF_3 + Al_2(SO_4)_3.$$

The solid double salt as well as its aqueous solution can be subjected to such decomposition by heating. If the solid double salt has been decomposed by heating, a mixture of aluminium salts is obtained; the separation of this mixture into its components may be performed by treating the mixture with water, whereby the aluminium sulphate is dissolved and as an undissolved residue aluminium fluoride is obtained.

The decomposition of an aqueous solution of the fluor-aluminum-sulphate double salt according to the above equation, is carried out by heating the solution preferably under pressure in an autoclave to about 200–300° C. The decomposition and the separation of aluminium fluoride from the solution start for instance at about 140° C. and the separation is completed at about 200–300° C.

Thus, the treatment of the aqueous solution in an autoclave yields a mixture of solid aluminium fluoride and a solution of aluminium sulphate. This solution can be used again for the conversion of fluor spar.

The process according to my present invention can be used for the treatment of fluor spar which contains higher amounts of silicic acid, without the danger of contaminating the aluminium fluoride with silicic acid.

Example 1.—100 kilograms of finely pulverized fluor spar are boiled under vigorous stirring with a solution of 270 kilograms of $Al_2(SO_4)_3.18H_2O$ in 1000 kilograms of water for 3 hours. The solution of $Al_2F_4SO_4$ thus obtained is separated from the precipitate, by filtration, and is heated in an autoclave to about 200° C. for 3 hours. The mixture obtained is subjected to filtration whereby solid aluminium fluoride and a solution of aluminium sulphate are obtained. The aluminium fluoride is dried, and the solution is used for further treatment of fluor spar. Before such treatment a further amount of aluminium sulphate may be added to the solution.

In carrying out my present invention the proportion between fluor spar and aluminium sulphate, and the concentration of the aluminium sulphate solution, as well as the concentration of the solution of $Al_2F_4SO_4$, which is subjected to heating under pressure, may be varied within wide limits. Such heating under pressure may be carried out as a discontinuous treatment or as a continuous process. In the continuous process a solution of $Al_2F_4SO_4$ is continuously introduced into, and the decomposed solution is continuously removed from the autoclave.

Example 2.—100 kilograms of finely pulverized fluor spar are boiled under vigorous stirring with a solution of 270 kilograms of $Al_2(SO_4)_3.18H_2O$ in 1000 kilograms of water for 3 hours. The solution of $Al_2F_4SO_4$ thus obtained is separated from the calcium sulphate by filtration, and is then evaporated. The evaporation may be carried out at ordinary atmospheric or at reduced pressure. The solid mass thus obtained is heated gradually to about 250° C., and kept for 3–4 hours at this temperature. The heating may be effected in a container, the walls of which are heated to the necessary temperature or, for instance, by hot gases which come into contact with the mass to be heated, and do not affect the quality of the compounds to be obtained. After cooling the mass is comminuted, and treated with hot water until the aluminium sulphate is completely dissolved. The insoluble residue consists of aluminium fluoride which is obtained with a yield closely approaching the theoretical value.

I have further found that other salts of aluminium may be used instead of aluminium sulphate for carrying out the present process.

By treating fluor spar, for instance, with a solution of $AlCl_3$, $AlBr_3$ or $AlI_3$, solutions of fluor-containing double salts of the formula $AlF_3.AlCl_3$, $AlF_3.AlBr_3$ and $AlF_3.AlI_3$ are formed according to the following equations:

$$3CaF_2 + 4AlCl_3 = 2(AlF_3.AlCl_3) + 3CaCl_2$$
$$3CaF_2 + 4AlBr_3 = 2(AlF_3.AlBr_3) + 3CaBr_2$$
$$3CaF_2 + 4AlI_3 = 2(AlF_3.AlI_3) + 3CaI_2$$

The impurities contained in the fluor spar remain undissolved, and can be separated from the solution by filtration.

A solution of aluminium nitrate reacts with fluor spar in a similar manner, shown by the following equation:

$$3CaF_2 + 4Al(NO_3)_3 = 3Ca(NO_3)_2 + 2Al(NO_3)_3AlF_3$$

If the solutions, which are obtained from fluor spar according to the above equations, and, which also contain $CaCl_2$, $CaBr_2$, $CaI_2$ or $Ca(NO_3)_2$ in addition to the fluor-containing double salts, are heated under pressure in closed containers to temperatures over 100° C., preferably to 200–300° C., the double salts contained in the solutions are decomposed and $AlF_3$ is precipitated. The precipitation starts at about 140° C. and is completed at 200°–300° C. A mixture of insoluble aluminium fluoride and two dissolved salts, for instance $AlCl_3 + CaCl_2$, $AlBr_3 + CaCl_2$, $AlI_3 + CaI_2$, $(Al(NO_3)_3 + Ca(NO_3)_2$, is thus obtained.

According to a modification of my process the solutions obtained from fluor spar in the above described manner, may be evaporated and the mass obtained as a residue may be decomposed by heating it to about 200–300° C. The residue is extracted with water whereby the soluble salts are dissolved, and aluminium fluoride is obtained as insoluble remainder. The solutions thus obtained are freed from the calcium salts by precipitation and may then be used for the further treatment of fluor spar. The precipitation of the calcium salts may, for instance, be effected by means of aluminium sulphate, according to the following equation, whereby the original composition of the solution is restored:

$$2Al(NO_3)_3 + 3Ca(NO_3)_2 + Al_2(SO_4)_3 = 4Al(NO_3)_3 + 3CaSO_4$$

The calcium sulphate formed is separated by filtration, and the solution obtained is used again for the treatment of fluor spar.

*Example 3.*—100 kilograms of finely pulverized fluor spar are boiled for 3 hours with a solution of 640 kilograms of $Al(NO_3)_3.9H_2O$ in 1500 liters of water. The impurities contained in the fluor spar remain undissolved and are separated from the solution by filtration.

The solution, which contains a mixture of the double salt $AlF_3.Al(NO_3)_3$ and $Ca(NO_3)_2$, is heated in an autoclave for 4 hours to about 220° C. The mixture containing precipitated $AlF_3$ and a solution of $Al(NO_3)_3$ and $Ca(NO_3)_2$ is filtered, the aluminium fluoride is dried, and the solution of $Al(NO_3)_3$ and $Ca(NO_3)_2$ can be used again for the treatment of fluor spar, preferably after adding a further amount of $Al(NO_3)_3$ and removing the calcium salt from the solution by precipitation.

*Example 4.*—100 kilograms of fluor spar are boiled for 3 hours with a solution of 640 kilograms of $Al(NO_3)_3.9H_2O$ in 1500 liters of water, and the solution obtained is separated from the undissolved impurities by filtration.

The water is then driven out from the solution of $AlF_3.Al(NO_3)_3$ and $Ca(NO_3)_2$ by evaporation, and the residue is heated gradually to about 250° C. The mass is kept at this temperature for about 3–4 hours. After cooling, the mass is comminuted and treated with water until practically all of the $Al(NO_3)_3$ and $Ca(NO_3)_2$ are dissolved. The residue consists of aluminium fluoride which is obtained with a yield of almost 100%.

*Example 5.*—100 kilograms of finely pulverized fluor spar are boiled for about 3 hours with a solution of 115 kilograms of $AlCl_3$ in 1300 liters of water. The solution obtained is separated from the undissolved impurities by filtration, and is further worked up as described in Example 3.

*Example 6.*—100 kilograms of fluor spar are boiled for about 3 hours with a solution of 230 kilograms of $AlBr_3$ in 1400 kilograms of water, and the solution obtained is separated from the undissolved impurities by filtration. The solution is then further worked up as described in Example 4.

By "decomposition temperature" in my present specification and claims it is to be understood temperatures are those at which the decomposition of the solid double salt $Al_2F_4SO_4$ and similar double salts, which contain aluminium fluoride and another salt of aluminium, or the decomposition of an aqueous solution of said salts, takes place. Such decomposition starts at temperatures over 100° C., for instance at 140° C., and can be completed preferably at temperatures of about 200°–300° C. Higher temperatures, which do not cause decomposition of the individual components of said double salts, may also be used.

I claim:

1. A process for obtaining aluminum fluoride from a water soluble double salt consisting of aluminum fluoride and another salt of aluminum, said process consisting of decomposing said water soluble double salt into aluminum fluoride and said other salt of aluminum by heating at the decomposition temperature, above 100° C., of said double salt, and separating aluminum fluoride from the other aluminum salt.

2. A process for obtaining aluminum fluoride from a water soluble double salt consisting of aluminum fluoride and another salt of aluminum, said process consisting of decomposing said water soluble double salt into aluminum fluoride and said other salt of aluminum by heating at the decomposition temperature, above 100° C., of said double salt, and separating aluminum fluoride from the other aluminum sale by dissolving said other aluminum salt in water.

3. A process for obtaining aluminum fluoride from the water soluble double salt $Al_2F_4SO_4$, said process consisting of decomposing said double salt into aluminum fluoride and aluminum sulfate by heating at the decomposition temperature, above 100° C., of said double salt, and separating aluminum fluoride from aluminum sulfate by dissolving said aluminum sulfate in water.

4. A process for obtaining aluminum fluoride from a water soluble double salt consisting of aluminum fluoride and another salt of aluminum, said process consisting of decomposing said water soluble double salt into aluminum fluoride and said other salt of aluminum by heating at the decomposition temperature, above 100° C., of an aqueous solution of said double salt, and separating aluminum fluoride from the solution of the other aluminum salt.

5. A process for obtaining aluminum fluoride from a water soluble double salt consisting of aluminum fluoride and another salt of aluminum, said process consisting of decomposing said water soluble double salt into aluminum fluoride and said other salt of aluminum by heating under pressure at the decomposition temperature, above 100° C., of an aqueous solution of said double salt, and separating aluminum fluoride from the solution of the other aluminum salt by filtration.

6. A process for obtaining aluminum fluoride from the water soluble double salt $Al_2F_4SO_4$, said process consisting of decomposing said double salt into aluminum fluoride and aluminum sulfate by heating an aqueous solution of said double salt to about 200°–300° C. in an autoclave, and separating aluminum fluoride from the aluminum sulfate solution by filtration.

LEOPOLD KAHL.